United States Patent
Certain et al.

(10) Patent No.: US 8,239,589 B1
(45) Date of Patent: Aug. 7, 2012

(54) BALANCING LATENCY AND THROUGHPUT FOR SHARED RESOURCES

(75) Inventors: Tate Andrew Certain, Seattle, WA (US); Roland Paterson-Jones, Seattle, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 43 days.

(21) Appl. No.: 12/751,957

(22) Filed: Mar. 31, 2010

(51) Int. Cl.
 G06F 3/00 (2006.01)
 G06F 13/00 (2006.01)
 G06F 13/28 (2006.01)
(52) U.S. Cl. ...... 710/39; 710/40; 711/158; 711/E12.075
(58) Field of Classification Search ............... 710/39, 710/40
 See application file for complete search history.

(56) References Cited

U.S. PATENT DOCUMENTS

| | | | |
|---|---|---|---|
| 6,553,476 B1 * | 4/2003 | Ayaki et al. | 711/204 |
| 7,606,944 B2 * | 10/2009 | Kalwitz et al. | 710/5 |
| 7,657,671 B2 * | 2/2010 | Bonwick et al. | 710/40 |
| 7,783,787 B1 * | 8/2010 | DeBergalis et al. | 710/1 |
| 2007/0168569 A1 * | 7/2007 | Bonwick et al. | 710/5 |
| 2008/0282030 A1 * | 11/2008 | Kalwitz et al. | 711/114 |
| 2008/0282031 A1 * | 11/2008 | Tanoue | 711/114 |
| 2011/0066770 A1 * | 3/2011 | Muppirala et al. | 710/39 |

* cited by examiner

*Primary Examiner* — Chun-Kuan Lee
*Assistant Examiner* — Ronald Modo
(74) *Attorney, Agent, or Firm* — Kilpatrick Townsend & Stockton LLP

(57) ABSTRACT

Input and output (I/O) operations performed by a data storage device are managed dynamically to balance aspects such as throughput and latency. Sequential read and write requests are sent to a data storage device whereby the corresponding operations are performed without time delay due to extra disk revolutions. In order to minimize latency, particularly for read operations, random read and write requests are held in a queue upstream of an I/O controller of the data storage device until the buffer of the data storage device is empty. The queued requests can be reordered when a higher priority request is received, improving the overall latency for specific requests. An I/O scheduler of a data server is still able to use any appropriate algorithm to order I/O requests, such as by prioritizing reads over writes as long as the writes do not back up in the I/O queue beyond a certain threshold.

26 Claims, 7 Drawing Sheets

BALANCING LATENCY AND THROUGHPUT FOR SHARED RESOURCES

In many electronic environments, users share resources such as data repositories, wherein many users can concurrently send multiple read and/or write requests to be executed against the same data instance, for example. Problems can arise, however, when the number of concurrent requests exceeds the ability of the instance to efficiently process those requests. Different types of request can have different requirements or expectations, and thus can be affected in different ways by the current load on a resource. For example, a user submitting a write request might not be particularly sensitive to latency issues, as the user likely will not care whether there is a slight delay in writing the information to a data storage device as long as the information for the write operation is eventually committed. A user submitting a read request, however, will generally only tolerate a certain amount of latency before the user experience is degraded. Further, certain applications submitting read operations rely upon a certain read rate, and extended delays can adversely affect operation of the application.

Certain conventional approaches prioritize read operations over write operations in order to minimize the latency experienced for read operations. Such an approach is not optimal in certain situations, however, as the average throughput of the system can suffer when the system must prioritize read operations and cannot perform sequential writes in a sequential manner. While an operating system or application can attempt to control the numbers and types of requests that are sent to a resource at any time, the ability of the resource to cache a number of requests, and reorder those requests, can affect the ability of the operating system or application to control the order in which operations are processed. Further, sending the requests to the resource one at a time can help to maintain desired levels of latency, but eliminates the ability of the resource to optimize for throughput, which can slow down the overall processing rate of the resource.

BRIEF DESCRIPTION OF THE DRAWINGS

Various embodiments in accordance with the present disclosure will be described with reference to the drawings, in which.

DETAILED DESCRIPTION

Figure 1:
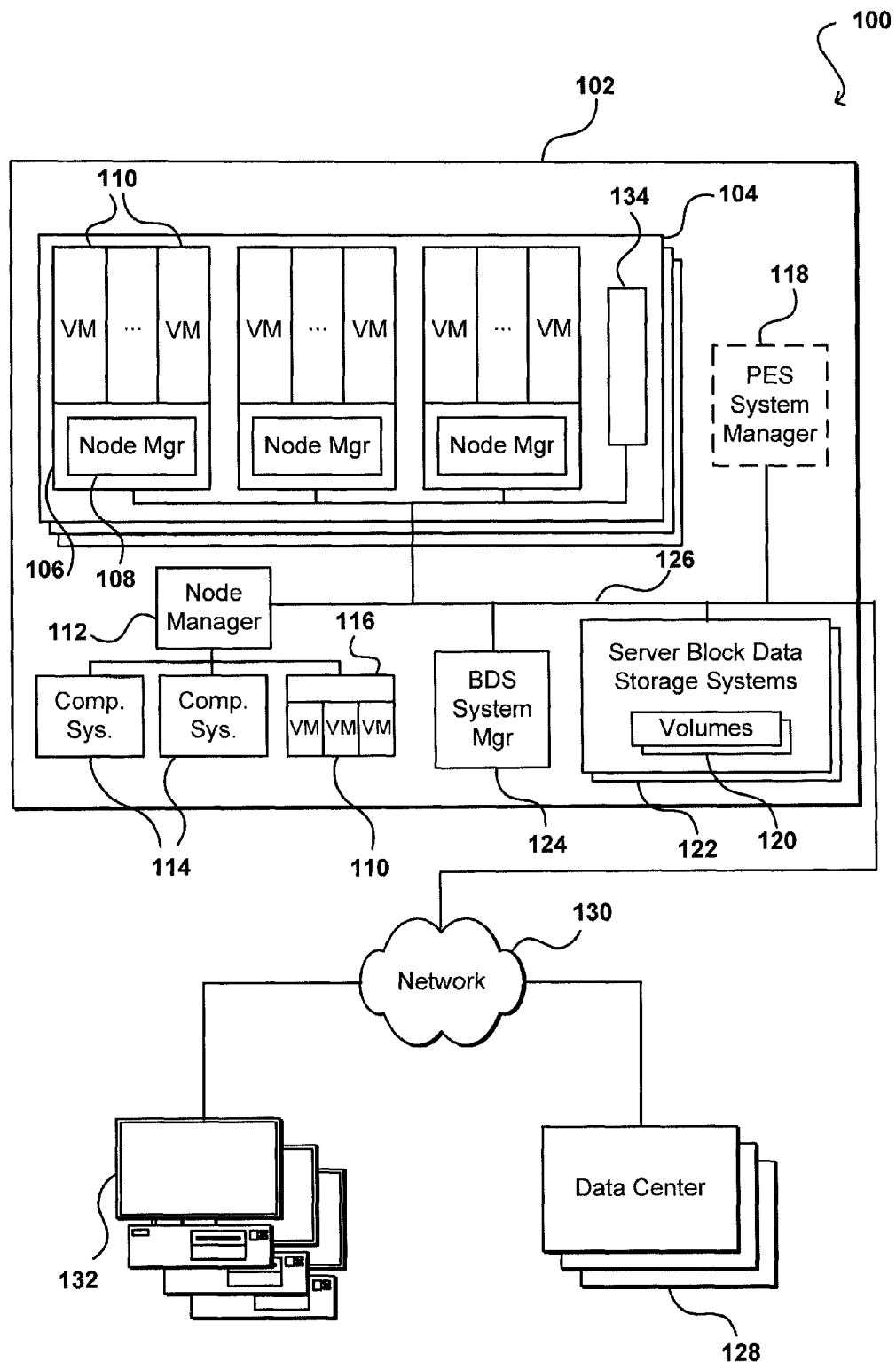
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of various resources in an electronic environment. In particular, various embodiments enable input and output operations (I/O operations) to be managed in a way that dynamically balances aspects such as throughput and latency. In various embodiments, sequential read and write operations (e.g., operations with a start byte or other starting location that is immediately adjacent an end byte or other ending location of an operation already buffered or in progress on the data storage device) are sent to a data storage device (e.g., a disk drive, data volume, or other block storage) such that the operations can be performed sequentially and without time delay due to extra disk revolutions, seek operations, or other such actions. In order to minimize latency, particularly for read operations, random reads and writes (i.e., operations with a start byte or other starting location not immediately adjacent an end byte or other ending location of a an operation buffered or in progress on the data storage device, which typically will require a seek operation) are held in a request queue or other temporary location upstream of an I/O controller or other component of the data storage device. The random requests can be held until the buffer of the data storage device is empty, in order to allow for the reordering of queued requests in case a higher priority request is received before the random request is sent to the data storage device. The number of requests to be sent to the data storage device at any given time thus is a dynamic decision, which provides flexibility and improves overall performance relative to static decisions utilized in conventional systems.

An I/O scheduler of a data server or other data management component is still able to use any appropriate algorithm to rank or order I/O requests, such as by prioritizing reads over writes as long as the writes do not back up in the I/O queue beyond a certain threshold, at which time at least some of the writes must be sent to the data storage device to prevent an overflow situation. An I/O scheduler of a data server can analyze each incoming request and place the request in an order in an I/O queue according to a ranking algorithm or other such ordering process or criteria. In some embodiments, when the I/O queue is not in an overflow situation and the writes are not backed up beyond an acceptable amount, the priority of requests in the queue can be: (1) read or write requests that are sequential with requests already buffered or in progress on the data storage device, (2) older read operations, (3) newer read operations, (4) older write operations, and (5) newer write operations. When the write operations begin to backup, the priority of at least a portion of the older write operations can increase accordingly. Many other ordering approaches can be used as well within the scope of the various embodiments.

Systems and methods in accordance with various embodiments are operable to management access to resources such as data storage. In at least some embodiments, these approaches include providing a block data storage service that uses multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first block data storage volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a Node Manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

FIG. 1 illustrates an example network configuration 100 in which multiple computing systems are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, a data center 102 includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct Node Manager module 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include distinct virtual machines, but may nonetheless each act as a computing node for one or more programs (not shown) being executed for a user. In this example, a Node Manager module 112 executing on a computing system (not shown) distinct from the host computing systems 114 and 116 is associated with those host computing systems to manage the computing nodes provided by those host computing systems, such as in a manner similar to the Node Manager modules 108 for the host computing systems 106. The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a PES System Manager module for the program execution service to assist in managing the execution of programs on the computing nodes provided by the host computing systems located within the data center (or optionally on computing systems located in one or more other data centers 128, or other remote computing systems 132 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the Node Manager modules 108 and 112 to manage program execution on computing nodes associated with the Node Manager modules, while in other embodiments the Node Manager modules may not assist in managing such execution of programs.

In this example the data center 102 also includes a computing system 124 that executes a Block Data Storage ("BDS") system manager module for the block data storage service to assist in managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network(s) 126 to programs executing on various computing nodes 110 and 114. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules to manage use of volumes by programs executing on associated computing nodes, while in other embodiments the Node Manager modules may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 122 (e.g., in a Peer to-peer manner, without any separate centralized BDS System Manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
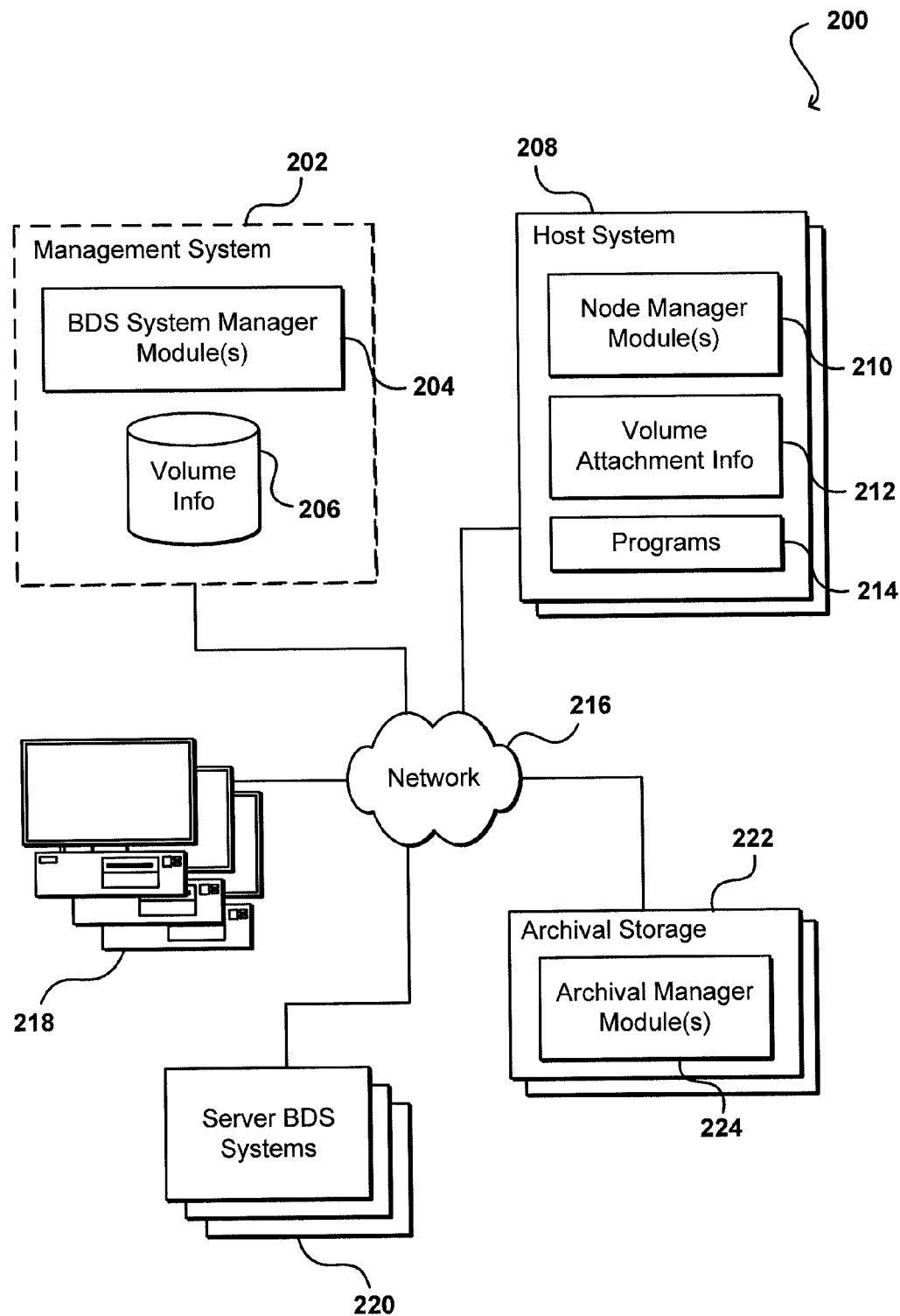
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be used in accordance with various embodiments. In this example, a management system 202, such as one or more server computers including one or more externally-facing customer interfaces, is programmed to execute an embodiment of at least one BDS System Manager module 204 to manage provisioning of non-local block data storage functionality to programs executing on host computing systems 208 and/or on at least some other computing systems 218, such as to block data storage volumes (not shown) provided by the server block data storage systems 220. Each of the host computing systems 208 in this example also executes an embodiment of a Node Manager module 210 to manage access of programs 214 executing on the host computing system to at least some of the non-local block data storage volumes, such as in a coordinated manner with the BDS System Manager module 204 over a network 216 (e.g., an internal network of a data center, not shown, that includes the computing systems 202, 208, 220, and optionally at least some of the other computing systems 218). In other embodiments, some or all of the Node Manager modules 210 may instead manage one or more other computing systems (e.g., the other computing systems 218).

In addition, multiple server block data storage systems 220 are illustrated that each can store at least some of the non-local block data storage volumes (not shown) used by the executing programs 214, with access to those volumes also provided over the network 216 in this example. One or more of the server block data storage systems 220 may also each store a server software component (not shown) that manages operation of one or more of the server block data storage systems, as well as various information (not shown) about the data that is stored by the server block data storage systems. Thus, in at least some embodiments, the server computing system 202 of FIG. 2 may correspond to the computing system 124 of FIG. 1, one or more of the Node Manager modules 108 and 112 of FIG. 1 may correspond to the Node Manager modules 210 of FIG. 2, and/or one or more of the server block data storage computing systems 220 of FIG. 2 may correspond to server block data storage systems 122 of FIG. 1. In addition, in this example embodiment, multiple archival storage systems 222 are illustrated, which may store snapshot copies and/or other copies of at least portions of at least some block data storage volumes stored on the server block data storage systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES System Manager module to coordinate execution of programs on the host computing systems 208 and/or other host computing systems 218, or the management system 202 or one of the other illustrated computing systems may instead execute such a PES System Manager module, although a PES System Manager module is not illustrated in this example.

In the illustrated embodiment, a Node Manager module 210 is executing in memory in order to manage one or more other programs 214 executing in memory on the computing system, such as on behalf of customers of the program execution service and/or block data storage service. In some embodiments, some or all of the computing systems 208 may host multiple virtual machines, and if so, each of the executing programs 214 may be an entire virtual machine image (e.g., with an operating system and one or more application programs) executing on a distinct hosted virtual machine computing node. The Node Manager module 210 may similarly be executing on another hosted virtual machine, such as a privileged virtual machine monitor that manages the other hosted virtual machines. In other embodiments, the executing program copies 214 and the Node Manager module 210 may execute as distinct processes on a single operating system (not shown) executed on a single computing system 208.

The archival storage system 222 is operable to execute at least one Archival Manager module 224 in order to manage operation of one or more of the archival storage systems, such as on behalf of customers of the block data storage service and/or of a distinct storage service that provides the archival storage systems. In other embodiments, the Archival Manager module(s) 224 may instead be executing on another computing system, such as one of the other computing systems 218 or on the management system 202 in conjunction with the BDS System Manager module 204. In addition, while not illustrated here, in some embodiments various information about the data that is stored by the archival storage systems 222 may be maintained in storage for the archival storage systems or elsewhere.

The BDS System Manager module 204 and Node Manager modules 210 may take various actions to manage the provisioning and/or use of reliable non-local block data storage functionality to clients (e.g., executing programs), as described in greater detail elsewhere. In this example, the BDS System Manager module 204 may maintain a database 206 that includes information about volumes stored on the server block data storage systems 220 and/or on the archival storage systems 222 (e.g., for use in managing the volumes), and may further store various other information (not shown) about users or other aspects of the block data storage service. In other embodiments, information about volumes may be stored in other manners, such as in a distributed manner by Node Manager modules 210 on their computing systems and/or by other computing systems. In addition, in this example, each Node Manager module 210 on a host computing system 208 may store information 212 about the current volumes attached to the host computing system and used by the executing programs 214 on the host computing system, such as to coordinate interactions with the server block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetachVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 3:
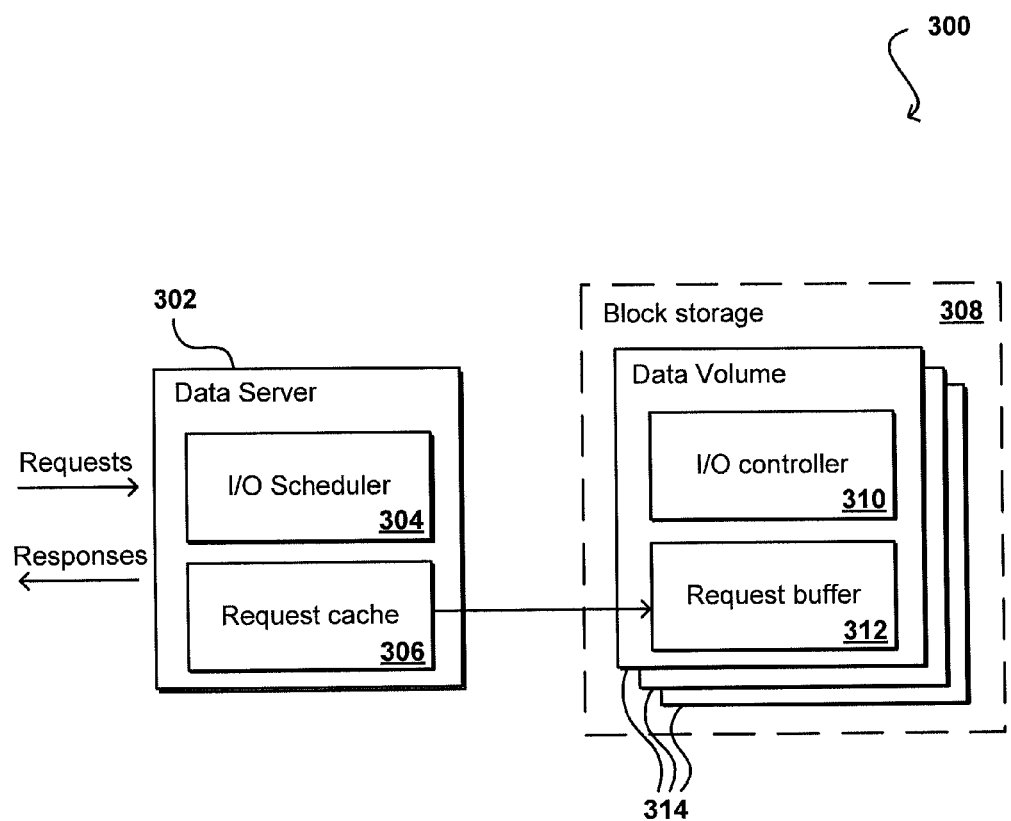
FIG. 3 illustrates an example configuration for managing requests for block storage that can be used in accordance with various embodiments.
Figure 4A:
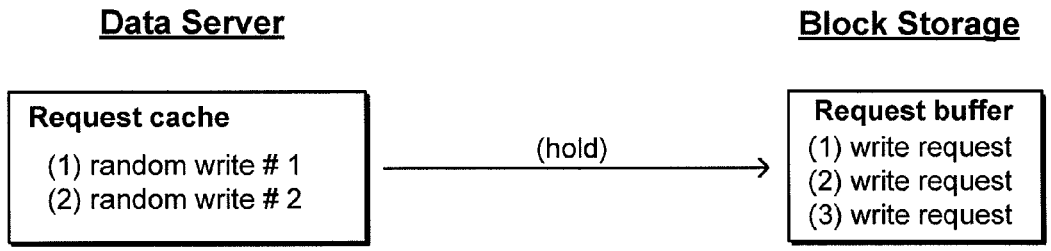
FIGS. 4(a)-4(d) illustrate examples of request management in accordance with various embodiments.
Figure 4B:
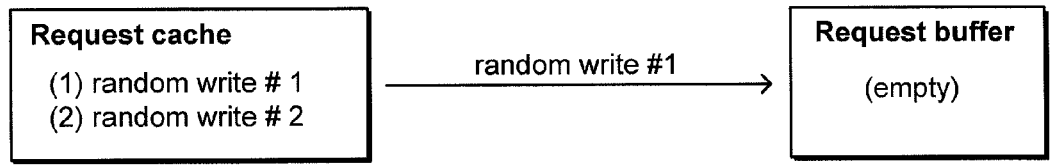
Figure 4C:
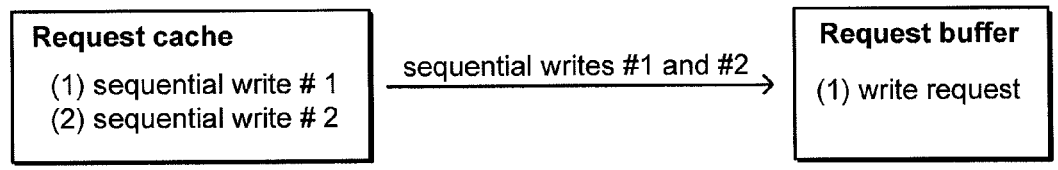
Figure 4D:

FIG. 3 illustrates an example configuration 300 corresponding to a portion of a BDS system such as those described with respect to FIGS. 1 and 2, where read and write requests are received for a type of resource, here relating to information to be written to, or read from, block storage 308. In this example, at least a portion of the requests received by the system are directed to a data server 302, as there can be multiple such servers each receiving requests as discussed above. As in conventional systems, the data server 302 can forward the requests to an appropriate data volume 314 managed by that data server.

An I/O scheduler 304 on the data server 302 can allocate requests to be sent to each data volume 314. As in conventional systems, the scheduler 304 can determine the order in which block I/O operations will be submitted to the data volumes 314. In many conventional approaches, the requests are forwarded to the data volumes in substantially the order in which the requests are received. In some conventional systems, the I/O scheduler 304 can attempt to minimize the occurrence of long access times (or "seek" times) for requests with a starting location on the respective disk that is a significant distance from the current position of the head for that disk. Various algorithms, such as an elevator algorithm, can be used to attempt to order the requests in a way that minimizes the distance which the disk head must travel between operations, thus minimizing the seek time and resulting latency for the requests.

In one example, a data volume might have throughput on the order of about 100 megabytes per second when data is written continually to disk. If the data volume is writing data to disk and the disk misses the physical point where the next received data packet should be written, the disk will have to wait for at least one full revolution to write that data. As a result, the throughput could decrease to about 10 megabytes per second, or a full order of magnitude, as after every 100 kilobytes the system might have to wait for one revolution of the disk. Thus, it can be advantageous to have multiple write requests available to the I/O controller 310 so the timing for the writes can be determined ahead of time and sequential writes can be processed without delay.

In some data servers, the I/O scheduler 304 maintains an ordered list of the pending I/O requests in a request cache 306, which are sorted by the starting position of the operation (e.g., sorted by block number). When a new I/O request is received by the data server, the I/O scheduler can insert the request into an appropriate position in the list based at least in part upon the block number. Inserting the request into the appropriate location can prevent the need to resort the list after each new request is received. Further, if a data volume is servicing a request at a location on the disk and a new request relates to the same region of the disk, the new request can be serviced or processed before moving to other regions for other requests, thus minimizing the overall seek time between operations. In some cases where the newly received I/O request relates to a pending request for an identical or immediately adjacent region of the disk, the I/O scheduler in some cases can merge the new request into the identical or adjacent request, in order to reduce the overall number of outstanding requests to be processed. Such an approach can result in sequential writes being grouped together or processed sequentially, while read operations from a distant region of the disk can continually be pushed towards the bottom of the order.

As discussed, however, it can be desirable to prioritize read requests over write requests, at least to a certain extent, in order to reduce the latency for read requests. Giving absolute priority to reads will not be optimal in many situations, as the writes might not be performed for a period of time can cause the request cache to overflow. It can be advantageous, however, to enable the I/O scheduler 304 of the data server 302 to provide some level of prioritization for read operations.

As illustrated in FIG. 3, the machine for each data volume 314 can have a request buffer 312 for buffering a number of requests that have been received from the data server 302 but not yet processed. An I/O controller 310 for each machine also can utilize a scheduling mechanism in order to maximize throughput by re-ordering requests in the request buffer 312 to minimize overall seek time. In some cases, the I/O controller 310 will change the order of the requests from the order that was initially determined by the I/O scheduler 304 of the data server 302. Since the I/O controller 310 typically will have more information about the layout of the data on the disk, the rotational speed, the current sectors under the head, and other such information than the I/O scheduler of the data server, the I/O controller typically can do a better job of optimizing throughput. Since the data volume 314 can buffer and order requests, however, the I/O scheduler 304 of the data server 302 actually loses some control over the order of processing, as the I/O scheduler 304 typically will not have the ability to control the internal ordering performed by the I/O controller 310 for a data volume.

One approach to ensure that the I/O controller 310 does not alter the ordering of requests sent according to the I/O scheduler 304 is to send one request at a time from the request cache of the data server 302 to the appropriate data volume 314, then not send another request until the previously sent request is processed. Such an approach would provide the I/O scheduler with complete control over the order in which requests are processed, and would enable the I/O scheduler to optimize for latency or any other appropriate criterion. By sending requests one at a time, however, the disk for the data storage volume will not be able to perform sequential writes for separate requests, as the disk will not have the information necessary to begin writing for a subsequent request until some time after the prior request has completed. The disk will then have to make at least one revolution before writing the information for the next request, which can reduce the throughput of the device. For large writes that include many requests relating to adjacent blocks of data to be written, the extra time needed to obtain each block (instead of continually writing those blocks) can be significant.

In at least some embodiments, an I/O scheduler 304 or similar component of a data server 302 can determine an extent to which the requests in the request cache 306 are random or sequential requests. For sequential I/O requests, where large file reads and writes typically will involve operating on one block immediately after an adjacent block, there is little delay introduced that is associated with repositioning the head of the drive. For random I/O requests, where relatively small file reads and writes occur at different areas on the disk, there will be a relatively large number of seeks and rotations, which can introduce a significant delay due to the necessary mechanical operations.

The I/O scheduler 304 can take into account the fact that the apparent amount latency for a write operation typically is very small, as a user sending a write request often will not care how long it takes (within reason) for the write operation to commit (although certain database or similar operations might rely upon the time to commit, such that the database can accept another operation with sequence and state being preserved). When a user sends a write request to a particular data volume 314, the data server can store the request in the local request cache 302 and indicate to the user that the request was received. As long as the data is not susceptible to loss, such as where the data is written concurrently to separate machines, the user typically will not care that the data has not yet actually been written to the data volume, and will experience an apparent low latency in processing the write. As should be understood, the actual write request will not be processed and written to the data volume until some time later. The request can remain in the request cache 306 until such time as the request is transferred to the request buffer 312 of the data volume 314 to be written to disk. From the point of view of the data server 302, each data volume 314 essentially operates as a disk drive.

The I/O scheduler 304 also can take into account the fact that users are typically more sensitive to the latency associated with read operations, as the user (or an application or service) typically will have to wait on the response including the data for the read operation. The apparent latency thus not only includes the time to place the request into a request cache 306, but also the time to move the request to the data volume and retrieve the data. Thus, even though it can be desirable to optimize the processing of requests based on criteria such as throughput, end users typically will be primarily interested in the timing of the read requests. The I/O scheduler thus can attempt to order requests based on whether the requests are random or sequential, while giving priority to read requests over write requests.

The I/O scheduler 304 in one embodiment can determine the number of (or rate at which) I/O requests can actually be serviced or processed, and can balance that rate among the incoming requests. The balancing can take into account the fact that the reads should be given priority where possible (or at least practical) without risking the request cache 306 filling up and potentially overflowing, enabling subsequent write requests to potentially get dropped. In some cases, the reads can be given priority over writes until the conditions meet or exceed a certain threshold condition, such as a certain percentage of the request cache being filled or the oldest write request being in the cache for a maximum period of time. In such a case, the writes can be processed until such time as the request cache is back to a desirable state.

An I/O scheduler 304 in accordance with various embodiments can analyze the incoming request stream and determine how many operations to send to the data volume. In some embodiments, the I/O scheduler 304 will order the incoming requests, and analyze the next request in the request cache 306 to determine whether the request is sequential, with respect to one of the requests queued in the request buffer 312 of a data volume 314, or whether the request is random with respect to the queued requests. If the next ordered request is sequential, the scheduler 304 can send the request to the request buffer 312, whereby the I/O controller can perform a sequential write for the adjacent requests. If the next request is a random request, the data server can hold the request in the request cache 306 (or other such memory) until the request buffer 312 of the data volume is emptied. The number of requests buffered on the data volume 314 thus is adjusted dynamically based at least in part upon the type of requests.

Using such an approach, random writes can essentially be sent to the data volume one at a time, such that random reads and writes can be prioritized according to the algorithm used by the I/O scheduler 304 (or a similar component). Where sequential requests are in the request cache 306, the I/O scheduler can send those requests to the data volume up to a capacity of the request buffer 312 in order to maximize throughput for the sequential operations.

FIGS. 4(*a*)-4(*d*) illustrate example decisions that an I/O scheduler could make in accordance with various embodiments. As should be understood, there can be a large number of requests in the request cache of the data server and/or the request buffer of the data volume, and a small number of requests is shown for simplicity of explanation.

In FIG. 4(*a*), there are two write requests in the request cache of the data server, each of which is random with respect to the write requests pending in the request buffer of the data volume. In such a situation, the I/O scheduler can decide to hold the next write request until the request cache empties, in case a higher priority request comes in that the I/O scheduler would like to move to the top of the request cache order.

In FIG. 4(*b*), the request buffer is empty so the I/O scheduler can go ahead and send the next request to the request buffer, whether the top ordered request is a read or write request. The I/O scheduler of the data server can prioritize the requests in the request queue of the data server using any appropriate algorithm or approach discussed above.

In FIG. 4(*c*) the request buffer is not empty, but the two write requests in the request cache of the data server are sequential with respect to the buffered write request for the data volume. In this case, the I/O scheduler can go ahead and send both sequential write operations to the data volume such that the I/O controller can maximize throughput for those requests.

In FIG. 4(*d*), a random read was received to the request cache while the random writes were being held due to there being buffered requests on the data volume. The I/O scheduler can prioritize the random read over the random writes and, when the request buffer is clear, send the random read to the request buffer. If the random writes had been sent to the request buffer in FIG. 4(*a*), the random read likely would have been processed after one or more of the random writes that would have already been cached on the data volume.

Figure 5A:
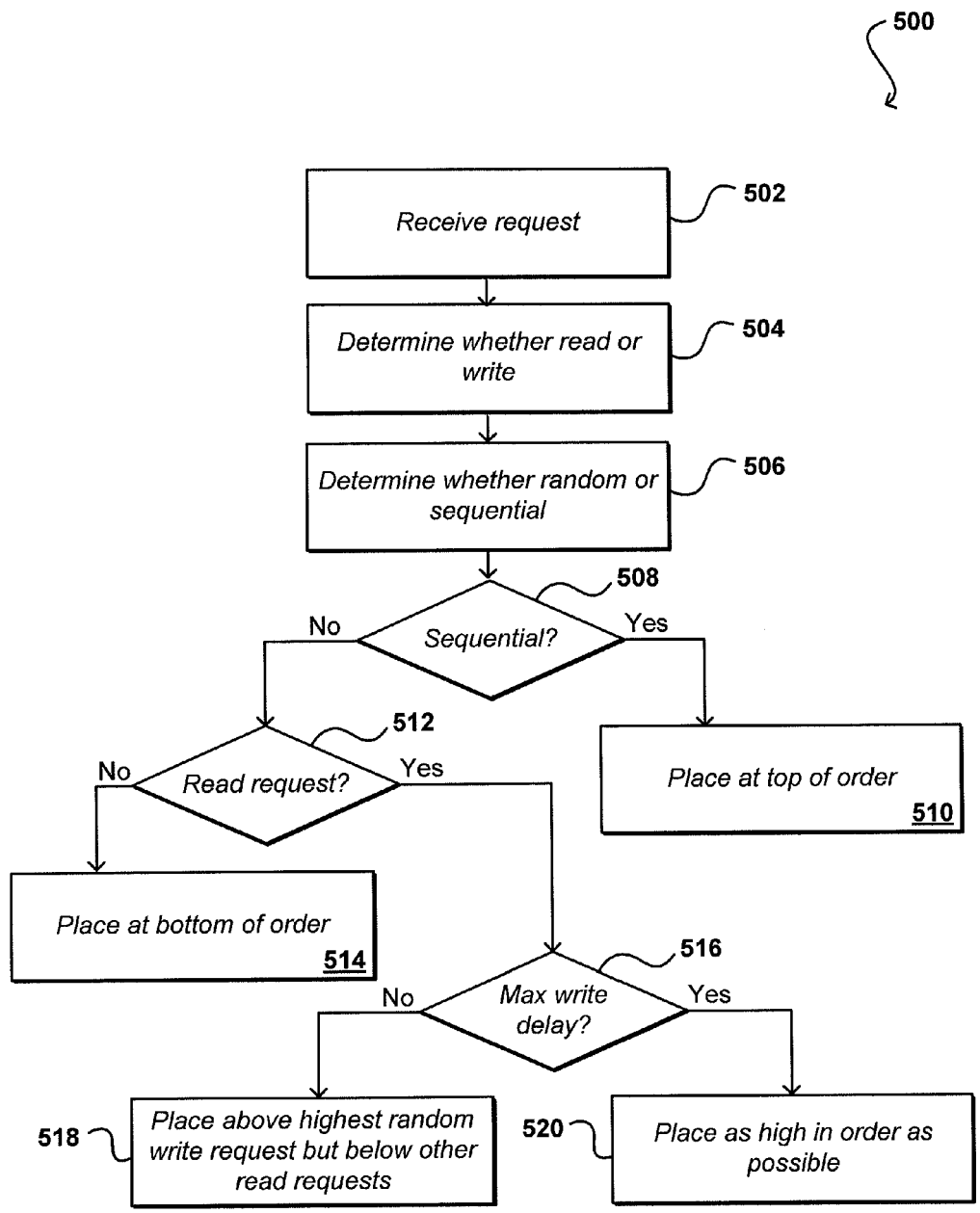
FIGS. 5(a)-5(b) illustrate an example process for managing requests that can be used in accordance with various embodiments.

FIGS. 5(*a*) and 5(*b*) illustrate an example process for processing I/O requests that can be used in accordance with various embodiments. It should be understood that additional, fewer, or alternative steps could be utilized in similar or different orders, or in parallel, unless other wise stated, within the scope of the various embodiments.

FIG. 5(*a*) illustrates a first portion 500 of the example process, wherein a request (e.g., an I/O request) is received, such as to an I/O scheduler of a data server 502. The I/O scheduler (or another component of the data server) can determine whether the request is a read or write request 504, as well as whether the request is random or sequential with respect to a request pending in a request buffer or currently being processed by a corresponding data volume 506. These determinations can be done in any order or in parallel, using any appropriate modules or components useful in making such determinations. If the request is a sequential request, either read or write, the request can be placed at the top of the queue order to be sent to block storage 510, whereby the sequential operations can be performed without delay.

If the request is not sequential, and the request is determined not to be a read request 512, the request can be placed at the bottom of the queue order. It should be understood that the most recently received random write request might not always be placed at the bottom of the queue, and as with many other determinations in such a process can depend upon any of a number of other factors as might be considered in other algorithms.

If the request is a random read request, a determination is made as to whether the maximum delay has been reached for write requests 516 (or whether some other criterion has been met due to prioritizing writes and sequential requests over reads and random requests). If not, the random read request can be placed at an appropriate location in the order in the queue, such as above the highest random write request but below the other read requests 518. If the maximum delay (or a similar criterion) has been met, the read request can be placed as high in the order as possible under the current conditions 520, such as to position the read request below other read requests and below a number of write requests necessary to move the queue out of the maximum delay state. Various alternatives are possible as well within the scope of the various embodiments.

Figure 5B:
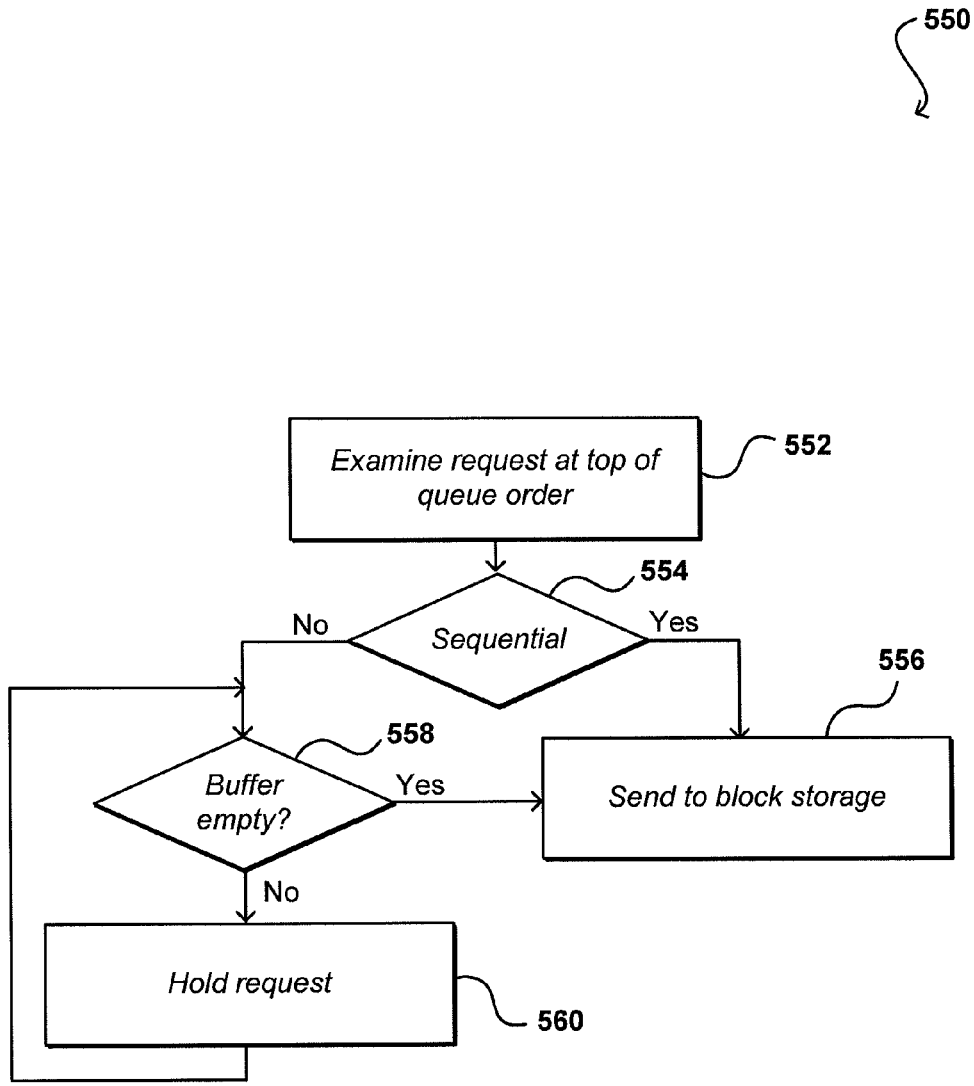

FIG. 5(b) illustrates a second portion 550 of such an example process, wherein the request at the top of the request cache order is examined by the I/O scheduler (or a similar component) of the data server 552. A determination is made as to whether the top request is a sequential request with respect to the block storage 554, and if so, the request is sent to the block data store 556 (unless the request buffer of the data volume is full or another such issue occurs). If the top request is random, the data server can determine whether the data buffer of the data volume is empty 558, and if so can send the request to the block data store 556. If the buffer is not empty, the data server can hold the request 560 and keep monitoring the buffer of the data volume to determine when the buffer is empty. As discussed, holding the top request enables a higher priority request to be placed above that request in the queue if a higher priority request is received or the data server otherwise determines that the requests should be reordered.

The I/O scheduler also can perform throttling of the incoming requests that recognizes differences between read and write requests. For example, a large spike in the amount of write operations may not require significant throttling because the system can absorb a certain number of write requests without having to apply back pressure to slow down the rate of write requests. The system typically will not have such tolerance for read requests, however, and thus might have to apply pressure relatively quickly to slow the rate of incoming read requests. The I/O scheduler can utilize a number of different algorithms to put appropriate back pressure on the incoming requests such that the writes can be allowed to spike without risking a loss of subsequent requests.

Figure 6:
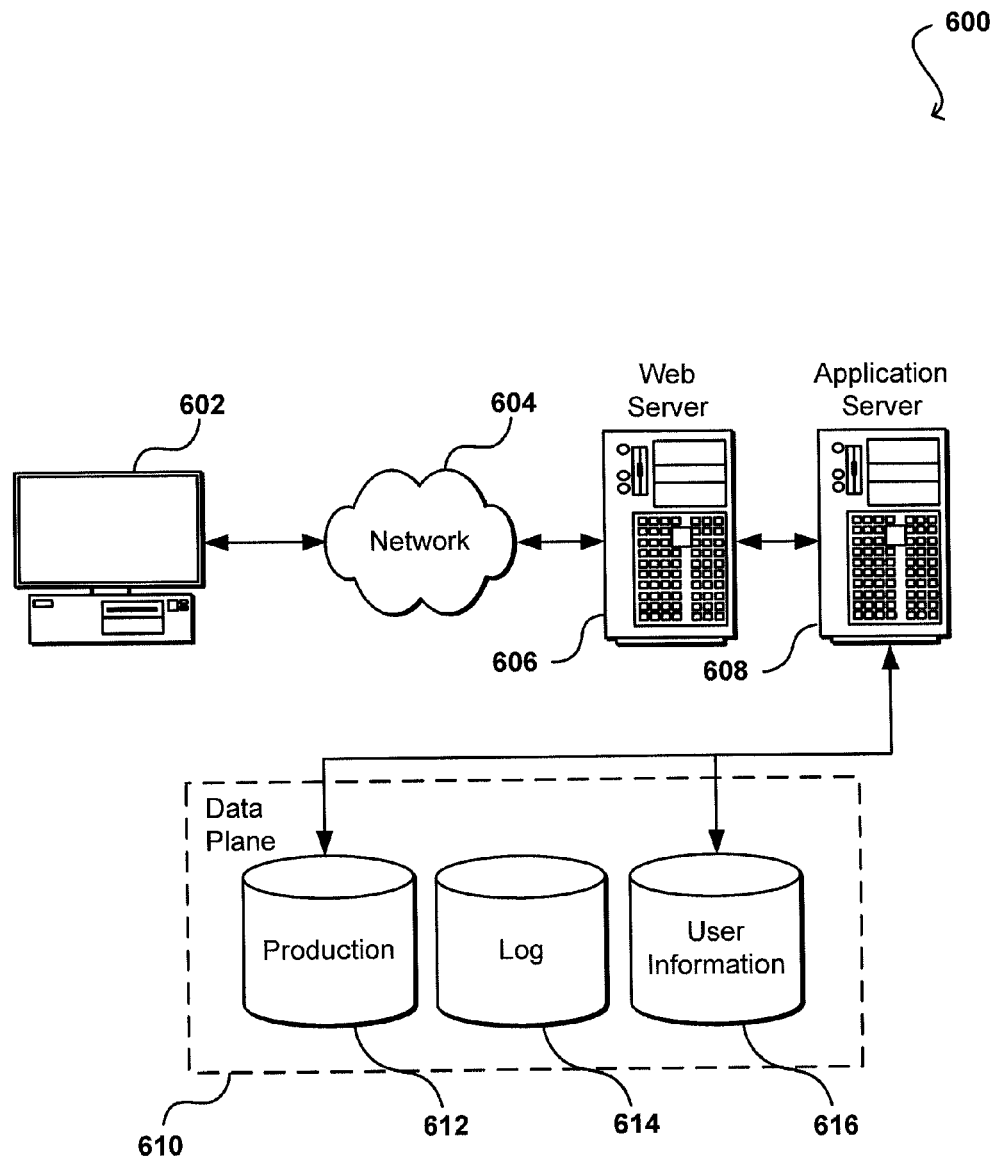
FIG. 6 illustrates an example environment that can take advantage of functionality of the various embodiments.

FIG. 6 illustrates an example of an environment 600 that can utilize and/or take advantage of aspects in accordance with various embodiments. As will be appreciated, although a Web-based environment is used for purposes of explanation, different environments may be used, as appropriate, to implement various embodiments. The environment 600 shown includes both a testing or development portion (or side) and a production portion. The production portion includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 618 allowing a user such as a developer, data administrator, or tester to access the system. The user device 618 can be any appropriate device or machine, such as is described above with respect to the client device 602. The environment also includes a development server 620, which functions similar to the application server 608 but typically runs code during development and testing before the code is deployed and executed on the production side and is accessible to outside users, for example. In some embodiments, an application server can function as a development server, and separate production and testing storage may not be used.

The data store 610 can include several separate data tables, databases, or other data storage mechanisms and media for storing data relating to a particular aspect. For example, the data store illustrated includes mechanisms for storing production data 612 and user information 616, which can be used to serve content for the production side. The data store also is shown to include a mechanism for storing testing data 614, which can be used with the user information for the testing side. It should be understood that there can be many other aspects that may need to be stored in the data store, such as for page image information and access right information, which can be stored in any of the above listed mechanisms as appropriate or in additional mechanisms in the data store 610. The data store 610 is operable, through logic associated therewith, to receive instructions from the application server 608 or development server 620, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

An environment such as that illustrated in FIG. 6 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing input/output (I/O) requests for a block storage device, comprising:
   under control of one or more computer systems configured with executable instructions,
      receiving an I/O request for a block storage device at a data server, the data server configured to forward requests to the block storage device, the data server storing, in a request queue, previously received I/O requests, in a determined request order, that have not yet been sent to the block storage device;
      determining a request order position for the received I/O request in the request queue by:
         when the received I/O request is a sequential request with respect to a request pending on the block storage device, placing the sequential request at the top of the request order in the request queue;
         when the received I/O request is a random write request, placing the received I/O request at the bottom of the request order in the request queue; and
         when the received I/O request is a random read request, placing the received I/O request above at least a portion of the random write requests in the request order in the request queue; and
      when the received I/O request is a top ordered request in the request order:
         forwarding the received I/O request to the block storage device when the received I/O request is a sequential request with respect to a request pending on the block storage device; and
         when the received I/O request is a random request, forwarding the received I/O request to the block storage device when there are no buffered requests on the block storage device.

2. The computer-implemented method of claim 1, further comprising:
   when a higher priority request is received by the data server, positioning the higher priority request as a new top ordered request in the request order.

3. The computer-implemented method of claim 1, further comprising:
   increasing an order of at least a portion of the random write requests in the request order when the data server reaches a maximum delay threshold with respect to the random write requests in the request queue.

4. A computer-implemented method of managing requests for a data storage device, comprising:
   under control of one or more computer systems configured with executable instructions,
      maintaining an ordered queue of pending requests for the data storage device, separate from the data storage device;
      when a top ordered request in the ordered queue is a sequential request with respect to a pending request of the data storage device, forwarding the top ordered request to the data storage device; and
      when a top ordered request in the ordered queue is a random request, holding the top ordered request in the ordered queue when there is a pending request on the data storage device before forwarding the top ordered request to the data storage device.

5. The computer-implemented method of claim 4, wherein read requests are ordered higher in the ordered queue than write requests.

6. The computer-implemented method of claim 4, further comprising:
   updating an order of the ordered queue when a top ordered request is forwarded to the data storage device or a new request is received to the ordered queue.

7. The computer-implemented method of claim 4, wherein the data storage device is at least one of a disk drive, a data volume, or a block data storage device.

8. The computer-implemented method of claim 4, further comprising:
   when a newly received request is a sequential request with respect to a request pending on the data storage device, placing the newly received request at the top of the ordered queue;
   when the newly received request is a random write request, placing the newly received request at the bottom of the ordered queue; and
   when the newly received request is a random read request, placing the newly received request above at least a portion of the random write requests in the ordered queue.

9. The computer-implemented method of claim 4, further comprising:
   when a higher priority request is received, positioning the higher priority request as a new top ordered request in the ordered queue.

10. The computer-implemented method of claim 4, further comprising:
    increasing an order of at least a portion of the random write requests in the ordered queue when a maximum delay threshold is reached with respect to the random write requests in the ordered queue.

11. The computer-implemented method of claim 4, wherein at least a portion of the pending requests are received by a Web services call to at least one application programming interface (API).

12. A system for managing input/output (I/O) requests sent to a block storage device, comprising:
at least one processor; and
memory including instructions that, when executed by the at least one processor, cause the system to:
receive an I/O request for a block storage device to a data server, the data server configured to forward requests to the block storage device, the data server further storing previously received I/O requests that have not yet been sent to the block storage device to a request queue in a determined request order;
determine a position for the received I/O request by:
when the received I/O request is a sequential request with respect to a request pending on the block storage device, place the sequential request at the top of the request order;
when the received I/O request is a random write request, place the received I/O request at the bottom of the request order in the request queue; and
when the received I/O request is a random read request, place the received I/O request above at least a portion of the random write requests in the request order in the request queue; and
when the received I/O request is a top ordered request in the request order:
forward the received I/O request to the block storage device when the received I/O request is a sequential request with respect to a request pending on the block storage device; and
when the received I/O request is a random request, forward the received I/O request to the block storage device when there are no buffered requests on the block storage device.

13. The system of claim 12, wherein the instructions when executed further cause the system to:
when a higher priority request is received by the data server when the received I/O request is a top ordered request in the request order, position the higher priority request as a new top ordered request in the request order.

14. The system of claim 12, wherein the instructions when executed further cause the system to:
increase an order of at least a portion of the random write requests in the request order when the data server reaches a maximum delay threshold with respect to the random write requests in the request queue.

15. A system for managing requests for a data storage device, comprising:
at least one processor; and
memory including instructions that, when executed by the at least one processor, cause the system to:
maintain an ordered queue of pending requests for the data storage device, separate from the data storage device;
when a top ordered request in the ordered queue is a sequential request with respect to a pending request of the data storage device, forward the top ordered request to the data storage device; and
when a top ordered request in the ordered queue is a random request, hold the top ordered request in the ordered queue when there is a pending request on the data storage device before forwarding the top ordered request to the data storage device.

16. The system of claim 15, wherein read requests are ordered higher in the ordered queue than write requests.

17. The system of claim 15, wherein the instructions when executed further cause the system to:
update an order of the ordered queue when a top ordered request is forwarded to the data storage device or a new request is received to the ordered queue.

18. The system of claim 15, wherein the data storage device is at least one of a disk drive, a data volume, or a block data storage device.

19. The system of claim 15, wherein the instructions when executed further cause the system to:
when a newly received request is a sequential request with respect to a request pending on the data storage device, place the newly received request at the top of the ordered queue;
when the newly received request is a random write request, place the newly received request at the bottom of the ordered queue; and
when the newly received request is a random read request, place the newly received request above at least a portion of the random write requests in the ordered queue.

20. The system of claim 15, wherein the instructions when executed further cause the system to:
when a higher priority request is received, position the higher priority request as a new top ordered request in the ordered queue.

21. A computer-readable storage medium including instructions for managing requests for a data storage device, the instructions when executed by a processor causing the processor to:
maintain an ordered queue of pending requests for the data storage device, separate from the data storage device;
when a top ordered request in the ordered queue is a sequential request with respect to a pending request of the data storage device, forward the top ordered request to the data storage device; and
when a top ordered request in the ordered queue is a random request, hold the top ordered request in the ordered queue if there is a pending request on the data storage device before forwarding the top ordered request to the data storage device.

22. The computer-readable storage medium of claim 21, wherein the instructions when executed further cause the system to:
update an order of the ordered queue when a top ordered request is forwarded to the data storage device or a new request is received to the ordered queue.

23. The computer-readable storage medium of claim 21, wherein the data storage device is at least one of a disk drive, a data volume, or a block data storage device.

24. The computer-readable storage medium of claim 21, wherein the instructions when executed further cause the system to:
when a newly received request is a sequential request with respect to a request pending on the data storage device, place the newly received request at the top of the ordered queue with any other sequential requests in the ordered queue;
when the newly received request is a random write request, place the newly received request at the bottom of the ordered queue; and
when the newly received request is a random read request, place the newly received request above at least a portion of the random write requests in the ordered queue.

25. The computer-readable storage medium of claim 21, wherein the instructions when executed further cause the system to:
when a higher priority request is received, position the higher priority request as a new top ordered request in the ordered queue.

26. The computer-readable storage medium of claim 21, wherein read requests are ordered higher in the ordered queue than write requests.

* * * * *